Oct. 21, 1930.   B. N. SOKOLOFF   1,779,339
SCREW DRIVER
Filed July 9, 1929
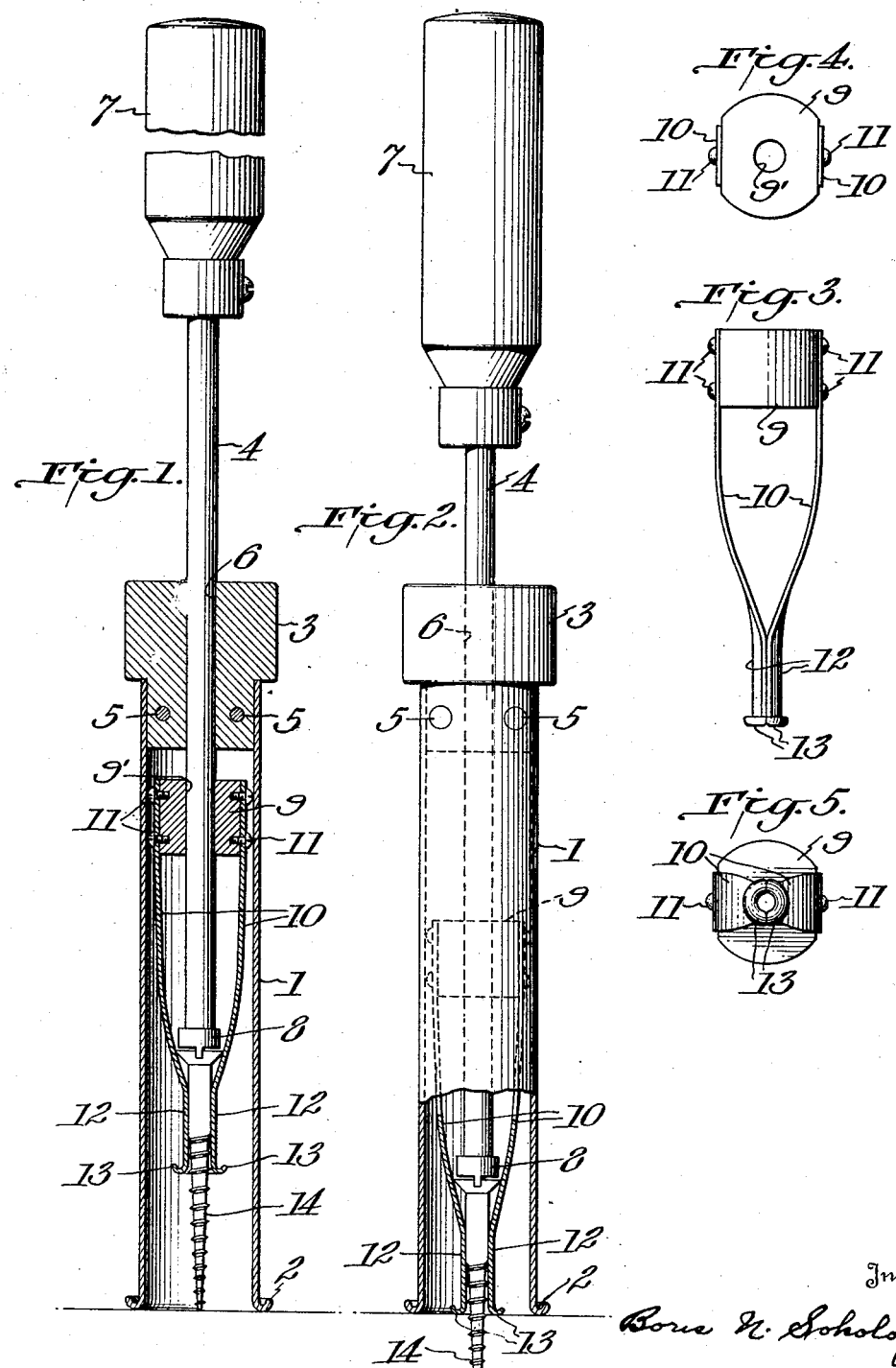
Inventor:
Boris N. Sokoloff,
By Byrnes Townsend & Brichenstein,
Attorneys Patented Oct. 21, 1930

1,779,339

UNITED STATES PATENT OFFICE

BORIS N. SOKOLOFF, OF WASHINGTON, DISTRICT OF COLUMBIA

SCREW DRIVER

Application filed July 9, 1929. Serial No. 376,918.

This invention relates to a screw driver and particularly to a screw driver of the type including a chuck for holding and guiding the screw.

An object of the invention is to provide a simple and inexpensive screw driver assembly which will hold the screw in longitudinal alinement with the driver and at a predetermined angle to the work.

A further object is to provide a device of the type stated including a guide for resting against the work, the guide being so constructed that it will not scratch or deface the face of the work.

These and other objects of the invention will be apparent from the following specification when taken with the accompanying drawings in which—

Figure 1 is a fragmentary side view of one embodiment of the invention, the guide and screw chuck being shown in longitudinal section;

Fig. 2 is a side elevation, partly in section, showing the screw when driven part way into the work;

Fig. 3 is a side elevation of the chuck for holding the screw, and

Figs. 4 and 5 are a top and bottom view, respectively of the chuck.

In the drawings, the numeral 1 indicates the elongated tubular member which is adapted to rest against the work and provide a guide for the screw. The tube 1 is preferably formed of relatively thin metal stock and a flange of suitable shape to increase the area of contact with the work is provided at the lower end 2 of the tube. As shown, a rounded bearing surface is formed by rolling back the lower end of the tube. The upper end of the tubular guide may be closed by block 3 of wood or metal through which the stem 4 of the screw driver passes. When formed, as shown in Fig. 1, separate from the tube 1, the member 3 may be secured to the tube by rivets 5 or the like.

The particular method employed in forming the member 3 as a part of, or securing the same to the guide 1 is not important, the essential requirement being that the member 3 shall provide a relatively long bearing 6 for the stem 4 of the screw driver.

As illustrated, the stem 4 is provided with a handle 7 of conventional form for manual operation and a head 8 having a bit for engaging the kerf of a screw, but it will be apparent that the stem 4 may, if desired, be driven by an electric motor or other convenient source of power. Obviously, the stem may be operated by a brace or a ratchet.

The chuck for holding the screw is slidably mounted within the tube 1, and comprises a head 9 having an axial opening 9' through which the screw driver stem 4 passes. The head 9 is of substantial axial length and is guided for rectilinear movement by its sliding engagement with both the tube 1 and the stem 4. Opposite sides of the head 9 may be cut away to provide flat surfaces to which the upper ends of spring blades 10 are secured by screws 11 or the like, the lower portion 12 of the blades being curved to semi-circular shape to form a tubular chuck which terminates in rounded bearing surfaces 13. Other types of chucks may be used instead of the specific form illustrated. For example, instead of employing sections of spring metal, the clutch members 10 may be relatively rigid and the spring action obtained by external or internal resilient members acting on the clutch sections 10 to hold the lower ends of the same in engagement with the screw.

To insert a screw 14 into the tubular chuck 12, the head 9 is lowered to or adjacent the open end of the tubular guide, the screw is inserted from the upper end of the chuck and is forced into the position shown in Fig. 1 by pressure applied through the stem 4.

The screw driver may be operated in substantially the same manner as the conventional screw driver by grasping the guide 1 in one hand and operating the screw driver handle 7 with the other hand. The tool is first held so that the end of the screw projects beyond the end 2 of the guide in order that the point of the screw may be properly positioned on the work. The guide tube 1 is then pressed downwardly into firm contact with the work, and the screw driver is rotated in the usual manner.

The screw 14 is firmly held in the chuck and, due to the fact that the chuck head 9 is constrained to move axially of the tubular guide, the screw is forced axially into the wood. Due to the guiding action of bearing 6, and to the mutual guiding action of stem 4 and chuck head 9, the pressure exerted by the screw driver is exerted axially of the screw.

As the screw enters the wood, the chuck moves downward until the bearing surfaces 13 engage the work. The further rotation of the screw carries the enlarged head of the screw into the flared upper end of the clutch and spreads the members 12 to release the screw.

While I have described the invention in connection with wood screws, it will be apparent that the screw driver may be employed for driving machine screws or other screw-threaded fastenings. For special work, the end bearing surface of the guide tube may lie in a plane which is not normal to the axis of the screw driver, or it may be given any special shape which may be required to provide a firm bearing between the guide tube and a work piece of irregular shape.

It will be noted that the guide and chuck are fixed to the screw driver by the enlarged driving head 8. While this arrangement is to be preferred since it prevents accidental separation or loss of the parts, the head 8 may be so shaped as to permit removal of the screw driver.

For convenience of description, reference has been made to the relative position of the parts as they appear in Figs. 1 and 2 of the drawings, but it is apparent that there is nothing in the construction or method of operation of the screw driver which prevents the driving of screws into surfaces which are vertical or inclined.

It will be apparent that various changes may be made in the several component parts of the device, and the relative size, shape and arrangement without departure from the spirit of my invention as set forth in the following claims.

I claim:

1. A screw driver comprising a screw driver stem terminating in a bit for engaging a screw, a tubular guide having one end thereof shaped for engagement with the face of the work, means at the opposite end of said guide providing a bearing in which said stem is supported for longitudinal and for rotary movement, and a chuck for holding a screw, said chuck comprising a head slidable within and guided for rectilinear movement by said tubular guide, said head having an aperture providing a bearing for said stem, and yieldable clutch members carried by said head and engaging the screw.

2. A screw driver comprising a screw driver stem terminating in a bit for engaging a screw, a tubular guide having one end thereof shaped for engagement with the face of the work, means at the opposite end of said guide providing an elongated bearing in which said stem is supported for longitudinal and for rotary movement, and a chuck for holding a screw, said chuck comprising a head slidable within and guided for rectilinear movement by said tubular guide, said head having a central aperture providing a bearing for said stem, and spring blades secured to said head and curved at their free ends to form a tubular chuck for receiving a screw.

3. A screw driver comprising a screw driver stem terminating in a bit for engaging a screw, a tubular guide having one end thereof shaped for engagement with the face of the work, means at the opposite end of said guide providing a bearing in which said stem is supported for longitudinal and for rotary movement, and a chuck for holding a screw, said chuck comprising a head slidable within and guided for rectilinear movement by said tubular guide, said head having an aperture providing a bearing for said stem, and yieldable clutch members carried by said head and engaging the screw, said clutch members terminating in smooth rounded surfaces capable of sliding on the face of the work.

4. A screw driver comprising a screw driver stem terminating in a bit for engaging a screw, a tubular guide having one end thereof shaped for engagement with the face of the work, means at the opposite end of said guide providing a bearing in which said stem is supported for longitudinal and for rotary movement, and a chuck for holding a screw, said chuck comprising a head slidable within and guided for rectilinear movement by said tubular guide, said head having an aperture providing a bearing for said stem, and yieldable clutch members carried by said head and engaging the screw; said tubular guide comprising a relatively thin-walled metal tube terminating at one end in a smooth rounded surface for contact with the face of the work.

5. A screw driver comprising a screw driver stem terminating in a bit for engaging a screw, a tubular guide having one end thereof shaped for engagement with the face of the work, means at the opposite end of said guide providing a bearing in which said stem is supported for longitudinal and for rotary movement, and a chuck for holding a screw, said chuck comprising a head slidable within and guided for rectilinear movement by said tubular guide, said head having an aperture providing a bearing for said stem, and yieldable clutch members carried by said head and engaging the screw; said tubular guide comprising a thin-walled metal tube, the metal at one end thereof being rolled back to form a smooth bearing surface for engagement with the work, and said clutch members terminating in smooth rounded surfaces capable of sliding on the face of the work.

6. An attachment for use with a power screw driver having a driving stem, a tubular guide having one end thereof shaped for engagement with the face of the work, means at the opposite end of said guide providing a bearing in which said stem is supported for longitudinal and for rotary movement, and a chuck for holding a screw, said chuck comprising a head slidable within and guided for rectilinear movement by said tubular guide, said head having an aperture providing a bearing for said stem, and yieldable clutch members carried by said head and engaging the screw.

In testimony whereof I affix my signature.

BORIS N. SOKOLOFF.